United States Patent
Ozaki et al.

(10) Patent No.: US 12,254,325 B2
(45) Date of Patent: Mar. 18, 2025

(54) RECOMMENDATION OF CANDIDATE SYSTEM CONFIGURATION TO BE CONSTRUCTED ON A CLOUD BASED ON CONFIGURATION REQUEST

(71) Applicant: Hitachi, Ltd., Tokyo (JP)

(72) Inventors: Nobuaki Ozaki, Tokyo (JP); Shinichi Hayashi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 122 days.

(21) Appl. No.: 18/110,029

(22) Filed: Feb. 15, 2023

(65) Prior Publication Data

US 2024/0103885 A1   Mar. 28, 2024

(30) Foreign Application Priority Data

Sep. 27, 2022   (JP) .................................. 2022-154162

(51) Int. Cl.
  *G06F 9/44*   (2018.01)
  *G06F 9/445*  (2018.01)
  *G06F 9/50*   (2006.01)

(52) U.S. Cl.
  CPC ........ *G06F 9/44505* (2013.01); *G06F 9/5005* (2013.01)

(58) Field of Classification Search
  CPC ... G06F 9/44505; G06F 9/5005; G06F 9/5072
  See application file for complete search history.

(56) References Cited

U.S. PATENT DOCUMENTS

| | | | |
|---|---|---|---|
| 11,720,823 B2 * | 8/2023 | Wetherbee | G06N 20/10 706/11 |
| 2014/0074647 A1 * | 3/2014 | Mukherjee | G06Q 30/06 705/26.7 |
| 2014/0200947 A1 * | 7/2014 | Gujar | H04L 67/02 705/7.26 |
| 2014/0280946 A1 * | 9/2014 | Mukherjee | H04L 67/51 709/226 |
| 2018/0287864 A1 * | 10/2018 | Hockett | H04L 67/10 |

(Continued)

FOREIGN PATENT DOCUMENTS

JP   2021064078 A   4/2021

*Primary Examiner* — Danny Chan
(74) *Attorney, Agent, or Firm* — MATTINGLY & MALUR, PC

(57) ABSTRACT

To support appropriate selection of a configuration of a cloud system. A computer system includes a processor 111, a storage apparatus 112 and an input/output apparatus 141, the storage apparatus 112 stores at least configuration condition information 132 indicating evaluation values for system configurations that can be constructed on cloud, the input/output apparatus 141 accepts a configuration request indicating a condition for a system configuration to be constructed on the cloud, the processor 111 obtains an evaluation value corresponding to the configuration request, compares the evaluation value corresponding to the configuration request with the evaluation values of the configuration condition information and determines a candidate for a system configuration to be proposed on the basis of a result of the comparison, and the input/output apparatus 141 outputs the candidate for the system configuration to be proposed.

9 Claims, 12 Drawing Sheets

| CONFIGURATION | LOGICAL FAILURE TOLERANCE | AZ FAILURE TOLERANCE | Region FAILURE TOLERANCE | COST INCREASED DATA | COST INCREASED SERVERS | ... |
|---|---|---|---|---|---|---|
| THE SAME R/THE SAME AZ, SERVICE OF COMPANY A | 3 | 0 | 0 | 2 | 1 | ... |
| THE SAME R/DIFFERENT AZ, SERVICE OF COMPANY A | 2 | 1 | 0 | 2 | 1 | ... |
| DIFFERENT R, SERVICE OF COMPANY A | 1 | 1 | 1 | 2 | 1 | ... |
| THE SAME R/THE SAME AZ, SERVICE OF COMPANY A + DIFFERENT R, SERVICE OF COMPANY A | 3 | 1 | 1 | 3 | 2 | ... |
| THE SAME R/DIFFERENT AZ, A PLURALITY OF AZ, SERVICE OF COMPANY B | 0 | 2 | 0 | 1 | 0 | ... |
| DIFFERENT R, A PLURALITY OF AZ, SERVICE OF COMPANY B | 0 | 2 | 2 | 1 | 0 | ... |
| THE SAME R/THE SAME AZ, SERVICE OF COMPANY A + DIFFERENT R, Multi AZ, SERVICE OF COMPANY C | 3 | 2 | 2 | 2 | 1 | ... |
| DIFFERENT R, DB REPLICATION | 0 | 4 | 4 | 2 | 2 | ... |
| THE SAME R/THE SAME AZ, SERVICE OF COMPANY A + DIFFERENT R, DB REPLICATION | 3 | 4 | 4 | 3 | 3 | ... |
| ... | ... | ... | ... | ... | ... | ... |

(56) References Cited

U.S. PATENT DOCUMENTS

| | | |
|---|---|---|
| 2021/0109672 A1 | 4/2021 | Nagata |
| 2023/0145025 A1* | 5/2023 | Qureshi ................ G06F 9/5094 718/100 |
| 2024/0095095 A1* | 3/2024 | Derbenwick Miller ..................... H04L 41/22 |

* cited by examiner

FIG. 5

| PROPOSAL PRIORITY | SORT KEY | ORDER | ... |
|---|---|---|---|
| EMPHASIZE BALANCE | AVAILABILITY/ COST | DESCENDING ORDER | ... |
| PRIORITIZE COST | COST | ASCENDING ORDER | ... |
| PRIORITIZE SPEED OF SYSTEM RECOVERY | RTO | TIME ORDER | ... |
| ... | ... | ... | |

FIG. 6

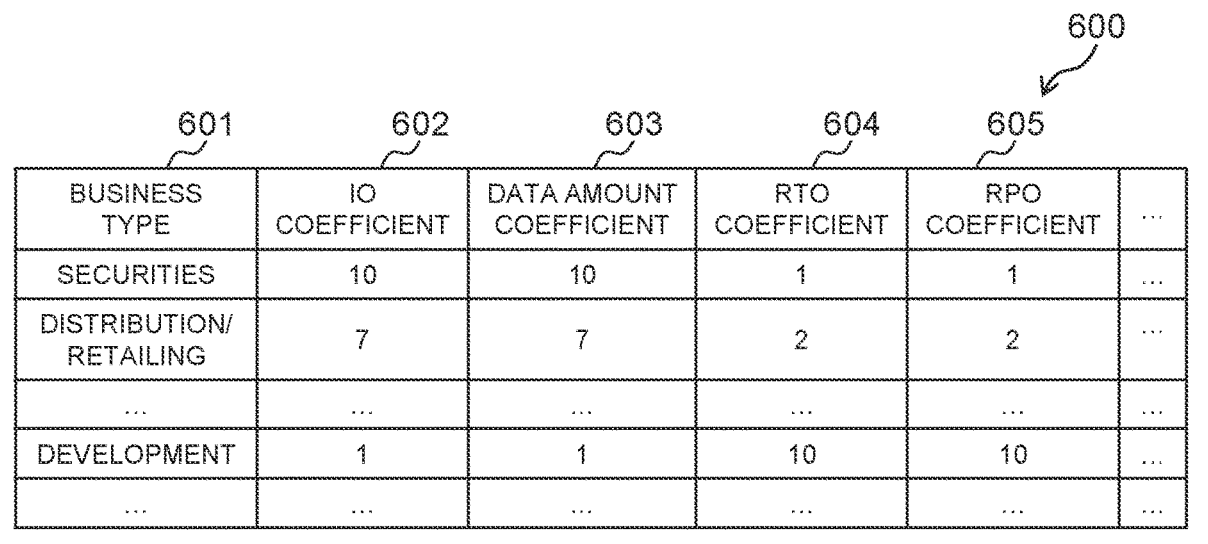

| BUSINESS TYPE | IO COEFFICIENT | DATA AMOUNT COEFFICIENT | RTO COEFFICIENT | RPO COEFFICIENT | ... |
|---|---|---|---|---|---|
| SECURITIES | 10 | 10 | 1 | 1 | ... |
| DISTRIBUTION/ RETAILING | 7 | 7 | 2 | 2 | ... |
| ... | ... | ... | ... | ... | ... |
| DEVELOPMENT | 1 | 1 | 10 | 10 | ... |
| ... | ... | ... | ... | ... | ... |

FIG. 8

| RECOVERY POLICY | DETERMINATION VALUE | ... |
|---|---|---|
| WAIT UNTIL RECOVERY FROM FAILURE | 0 | ... |
| RECOVERED WITHIN SEVERAL HOURS | 1 | ... |
| RECOVERED WITHIN SEVERAL TENS OF MINUTES | 2 | ... |
| SEAMLESSLY SHIFT | 4 | ... |
| ... | ... | ... |

FIG. 10

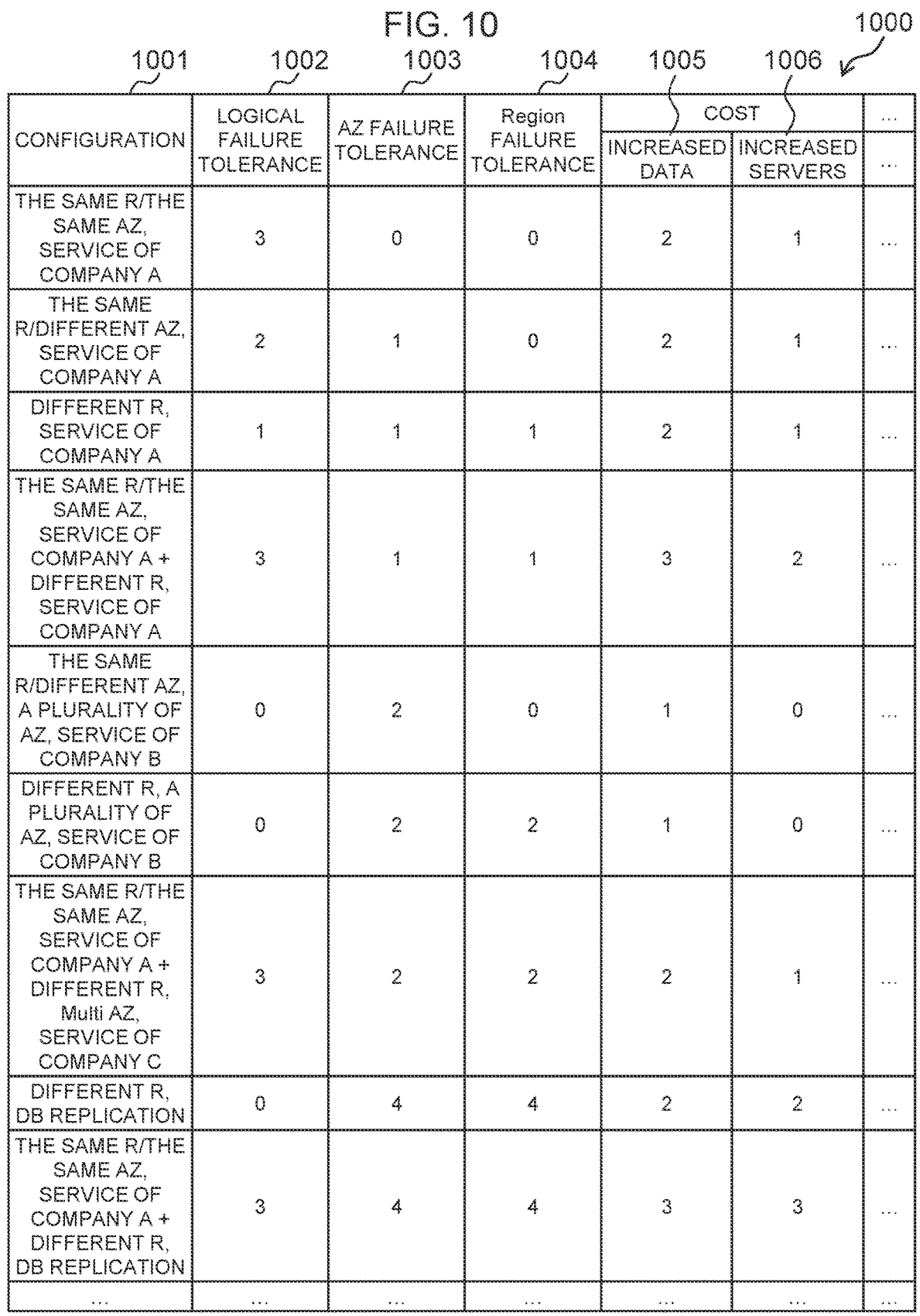

| CONFIGURATION | LOGICAL FAILURE TOLERANCE | AZ FAILURE TOLERANCE | Region FAILURE TOLERANCE | COST INCREASED DATA | COST INCREASED SERVERS | ... |
|---|---|---|---|---|---|---|
| THE SAME R/THE SAME AZ, SERVICE OF COMPANY A | 3 | 0 | 0 | 2 | 1 | ... |
| THE SAME R/DIFFERENT AZ, SERVICE OF COMPANY A | 2 | 1 | 0 | 2 | 1 | ... |
| DIFFERENT R, SERVICE OF COMPANY A | 1 | 1 | 1 | 2 | 1 | ... |
| THE SAME R/THE SAME AZ, SERVICE OF COMPANY A + DIFFERENT R, SERVICE OF COMPANY A | 3 | 1 | 1 | 3 | 2 | ... |
| THE SAME R/DIFFERENT AZ, A PLURALITY OF AZ, SERVICE OF COMPANY B | 0 | 2 | 0 | 1 | 0 | ... |
| DIFFERENT R, A PLURALITY OF AZ, SERVICE OF COMPANY B | 0 | 2 | 2 | 1 | 0 | ... |
| THE SAME R/THE SAME AZ, SERVICE OF COMPANY A + DIFFERENT R, Multi AZ, SERVICE OF COMPANY C | 3 | 2 | 2 | 2 | 1 | ... |
| DIFFERENT R, DB REPLICATION | 0 | 4 | 4 | 2 | 2 | ... |
| THE SAME R/THE SAME AZ, SERVICE OF COMPANY A + DIFFERENT R, DB REPLICATION | 3 | 4 | 4 | 3 | 3 | ... |
| ... | ... | ... | ... | ... | ... | ... |

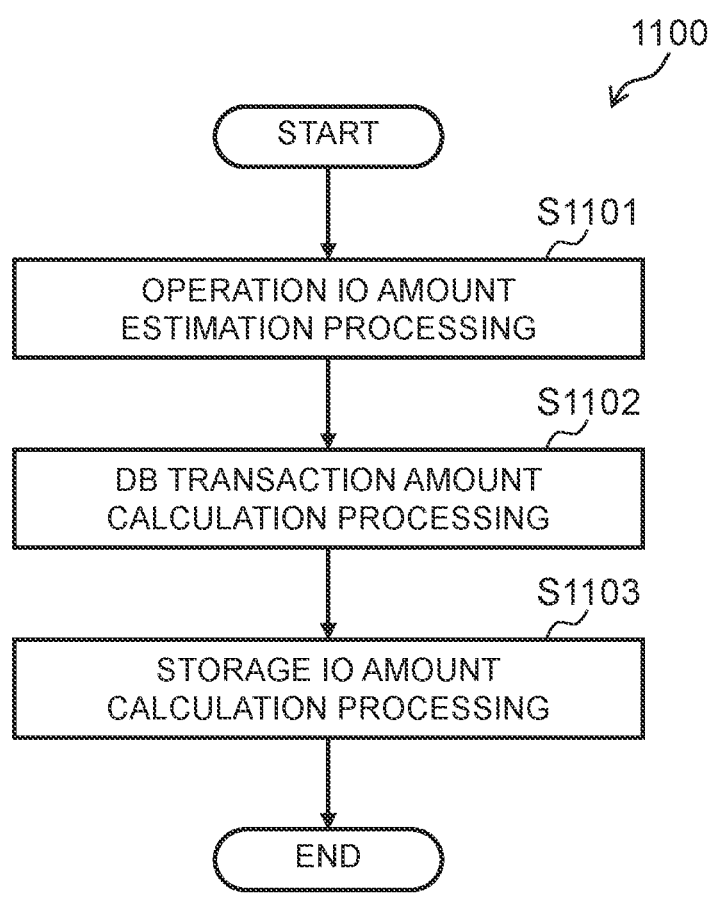

FIG. 12

| DB TRANSACTION DENSITY | MACHINE SPECS | ... |
|---|---|---|
| ~1K | Level 1 | ... |
| ~10K | Level 2 | ... |
| ~100K | Level 3 | ... |
| 100K ~ | Level 4 | ... |
| ... | ... | ... |

RECOMMENDATION OF CANDIDATE SYSTEM CONFIGURATION TO BE CONSTRUCTED ON A CLOUD BASED ON CONFIGURATION REQUEST

REFERENCE TO RELATED APPLICATION

The present application claims priority from Japanese application JP2022-154162, filed on Sep. 27, 2022, the contents of which is hereby incorporated by reference into this application.

BACKGROUND OF THE INVENTION

Field of the Invention

The present invention relates to a computer system, a system configuration candidate output method, and a storage medium storing a system configuration candidate output program.

Description of the Related Art

In related art, application systems have been operated by purchasing apparatuses for dedicated servers, storages, networks, and the like, which is called on-premises.

However, in recent years, cloud systems that make IT resources such as servers, storages and networks available on demand have appeared, which enables quick and flexible procurement of IT resources. This results in increase in cases where operation environments of application systems shift from on-premises in related art to cloud.

If a user determines apparatuses such as a server and a storage that the user desires to use and a cloud service, it is necessary to make an estimate of performance, availability, and the like, in accordance with business requirements. Japanese Patent Laid-Open No. 2021-064078 discloses a technique regarding such an estimate. Japanese Patent Laid-Open No. 2021-064078 describes that "an apparatus creates an extended configuration plan of a storage system including a plurality of nodes. The apparatus includes a processor, and a storage apparatus that stores a program to be executed by the processor. The processor acquires information on required performance of each of hosts that access the storage system, acquires information on performance of each of a plurality of existing nodes of the storage system, determines the number and performance of one or more nodes to be added, and a coupling mode of the hosts and the storage system, and puts the above-described number and performance of one or more nodes to be added and the coupling mode in the extended configuration plan".

Use of Japanese Patent Laid-Open No. 2021-064078 enables estimate of a configuration of apparatuses that satisfy requirements. It is also possible to make an estimate of specific functions of a specific cloud service using a similar method. However, in related art, it is impossible to determine in advance a system configuration as to what kinds of functions of a number of cloud services are to be combined while taking into account requirements such as performance and availability and cost. Further, even if a business type, a scale, and the like, are determined in advance, judgment by a skilled person is required to quantify necessary requirements.

It is therefore an object of the present invention to support appropriate selection of a configuration of a cloud system.

SUMMARY OF THE INVENTION

To solve the above-described problem, one of a typical computer system of the present invention includes a processor, a storage apparatus and an input/output apparatus, and the storage apparatus stores at least configuration condition information indicating evaluation values for system configurations that can be constructed on cloud, the input/output apparatus accepts a configuration request indicating a condition for a system configuration to be constructed on the cloud, the processor obtains an evaluation value corresponding to the configuration request, compares the evaluation value corresponding to the configuration request with the evaluation values of the configuration condition information, determines a candidate for a system configuration to be proposed on the basis of a result of the comparison, and the input/output apparatus outputs the candidate for the system configuration to be proposed.

Further, to solve the above-described problem, one of a typical system configuration candidate output method of the present invention is a method to be performed by a computer system that stores at least configuration condition information indicating evaluation values for system configurations that can be constructed on cloud, the system configuration candidate output method including a step of accepting a configuration request indicating a condition for a system configuration to be constructed on the cloud, a step of obtaining an evaluation value corresponding to the configuration request, a step of comparing the evaluation value corresponding to the configuration request with the evaluation values of the configuration condition information, a step of determining a candidate for a system configuration to be proposed on the basis of a result of the comparison, and a step of outputting the candidate for the system configuration to be proposed.

Further, to solve the above-described problem, one of a typical storage medium storing a system configuration candidate output program of the present invention, stores a program for causing a computer system that stores at least configuration condition information indicating evaluation values for system configurations that can be constructed on cloud to execute a step of accepting a configuration request indicating a condition for a system configuration to be constructed on the cloud, a step of obtaining an evaluation value corresponding to the configuration request, a step of comparing the evaluation value corresponding to the configuration request with the evaluation values of the configuration condition information, a step of determining a candidate for a system configuration to be proposed on the basis of a result of the comparison, and a step of outputting the candidate for the system configuration to be proposed.

According to the present invention, it is possible to support appropriate selection of a configuration of a cloud system. Problems, configurations and effects other than those described above will become clearer from the following description of embodiments.

BRIEF DESCRIPTION OF THE DRAWINGS

FIG. 5 is an example of information corresponding to proposal priority policies;

FIG. 6 is an example of information corresponding to a business type policy;

FIG. 8 is an example of information corresponding to a recovery policy upon occurrence of a cloud failure;

FIG. 10 is an explanatory diagram illustrating an example of configuration condition information;

FIG. 11 is a flowchart illustrating system load calculation processing; and

FIG. 12 is an example of an instance sizing table.

DETAILED DESCRIPTION OF THE PREFERRED EMBODIMENT

Figure 1:
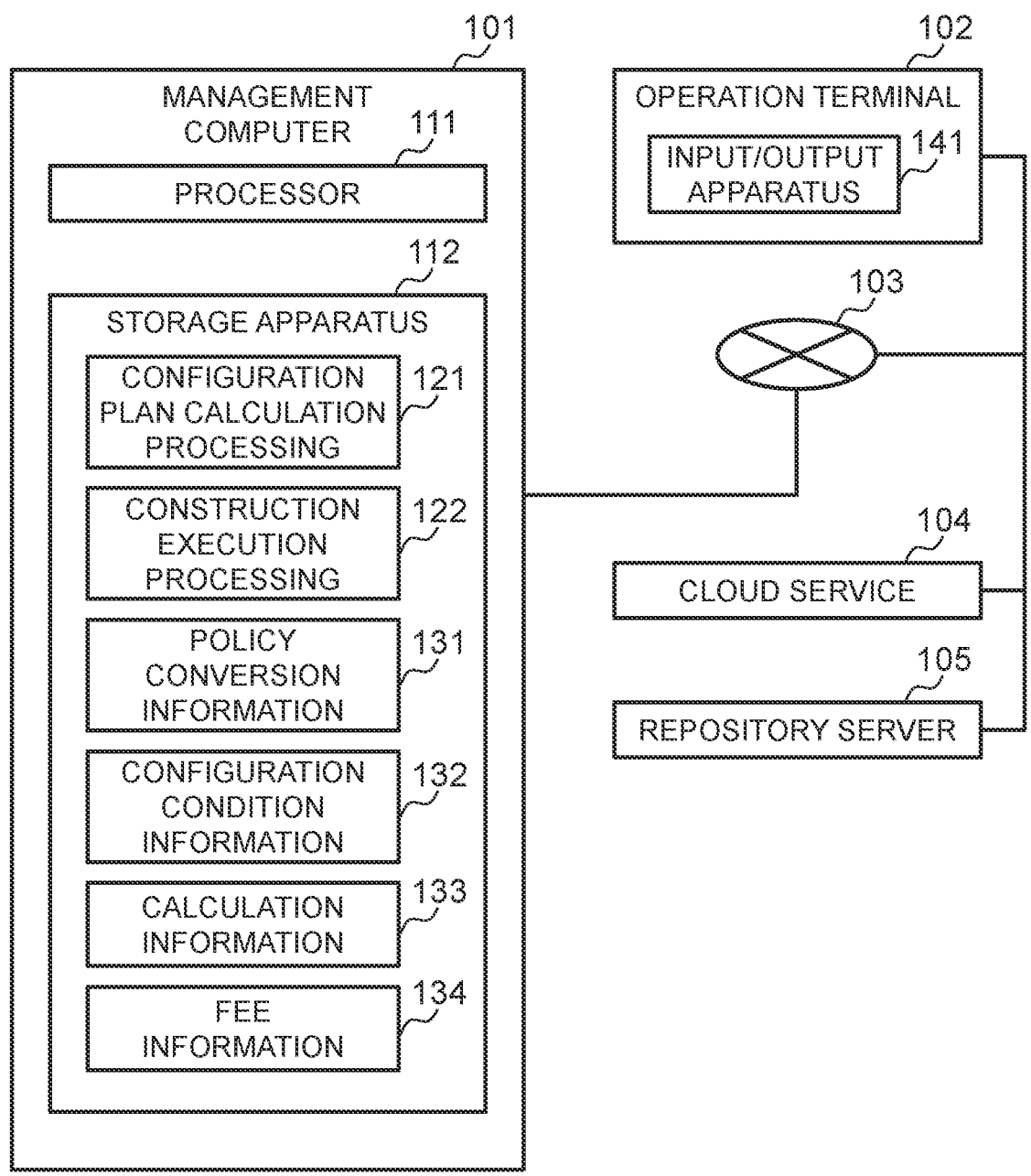
FIG. 1 is a block diagram illustrating a configuration example of a computer system in a first embodiment of the present invention.

In the following description, a "memory" is one or more memory devices and typically may be a main storage device. At least one memory device in the memory may be a volatile memory device or a non-volatile memory device.

Further, in the following description, a "persistent storage apparatus" is one or more persistent storage devices. The persistent storage device is typically a non-volatile storage device (for example, an auxiliary storage device) and specifically, for example, a hard disk drive (HDD) or a solid state drive (SSD).

Further, in the following description, a "storage apparatus" may be one of the above-described "memory" or the "persistent storage apparatus".

Further, in the following description, a "processor" is one or more processor devices. At least one processor device is typically a micro processor device like a central processing unit (CPU), but the processor device may be other types of processor devices like a graphics processing unit (GPU). Further, at least one processor device may be a single core or a multicore. Still further, at least one processor device may be a processor core. Yet further, at least one processor device may be a processor device in a broad sense such as a hardware circuit that performs part or all of the processing (for example, field-programmable gate array (FPGA)) or an application specific integrated circuit (ASIC).

Further, while in the following description, information for which an output can be obtained with respect to an input will be described using expression such as "xxx table", the information may be data having any structure or may be a learning model like a neural network that generates an output with respect to an input. Thus, the "xxx table" can be read as "xxx information". Still further, in the following description, a configuration of each table is an example, and one table may be divided into two or more tables, or all or part of two or more tables may be one table or may include some data fields (not illustrated).

Further, while in the following description, processing will be described using a "program" as subject, determined processing is performed using the storage apparatus and/or an interface apparatus, and the like, as appropriate by the program being executed by the processor, and thus, the subject of the processing may be a processor (or a device like a controller that includes the processor). The program may be installed in an apparatus such as a computer from a program source. The program source may be, for example, a program distribution server or a computer-readable (for example, non-transitory) recording medium. Further, in the following description, two or more programs may be implemented as one program, or one program may be implemented as two or more programs.

Further, while in the following description, a function will be described using expression such as "xxx unit", the function may be implemented by one or more computer programs being executed by a processor or may be implemented by one or more hardware circuits (for example, an FPGA or an ASIC). In a case where the function is implemented by the program being executed by a processor, determined processing is performed using the storage apparatus and/or the interface apparatus, and the like, as appropriate, and thus, the function may be made at least part of the processor. Further, processing described using a function as subject may be made processing to be performed by a processor or an apparatus including the processor. Further, the program may be installed from a program source. The program source may be, for example, a program distribution computer or a computer-readable recording medium (for example, a non-transitory recording medium). Description of each function is an example, and a plurality of functions may be integrated into one function, or one function may be divided into a plurality of functions.

Further, in the following description, the "computer system" is a system including one or more physical computers. The physical computer may be either a general-purpose computer or a dedicated computer.

Further, only control lines and information lines considered to be necessary for description are illustrated, and all control lines and information lines necessary for implementation are not necessarily illustrated. It may be considered that actually almost all components are coupled to each other.

Hereinafter, an aggregate of one or more computers that manage an information processing system and display information for display in the present example may be referred to as a management system. In a case where a computer for management (hereinafter, a management computer) displays information for display, the management computer is the management system. Further, a combination of the management computer and a computer for display is also the management system. Still further, processing identical or similar to processing of the management computer may be implemented with a plurality of computers to increase speed and reliability of management processing, in which case, the plurality of computers (including the computer for display in a case where the computer for display performs display) are the management system.

Note that the present invention is not limited to the examples described above and incorporates various modifications and identical or similar configurations within a gist of the appended claims. For example, the examples described above are provided to describe the present invention in detail in an easy-to-understand manner, and the present invention is not necessarily limited to one including all the described components. Further, part of the configuration in one example may be replaced with a configuration of another example. Still further, a configuration of one example is added to a configuration of another example. Yet further, other configurations may be added to, deleted from or replaced with part of the configuration in each example.

Hereinafter, one embodiment of the present invention will be described in detail below with reference to the drawings.

Example 1

Example of Problem Solution Processing

FIG. 1 is a block diagram illustrating a configuration example of a computer system in a first embodiment of the present invention. The computer system is a system in which a management computer 101, an operation terminal 102, a cloud service 104 that is to be managed by the management computer, and a repository server 105 that holds program data to be utilized when a target system is constructed can be coupled to each other via a network 103.

In a case where a target system is not actually constructed on the cloud service in accordance with a configuration plan calculated by the management computer, the cloud service 104 does not have to be coupled to the repository server 105 via the network 103. Further, in a case where the management computer 101 includes an input/output apparatus (not illustrated), processing which will be described below may be executed by utilizing the input/output apparatus held by the management computer 101 without utilizing the operation terminal 102.

The management computer 101 includes a processor 111 and a storage apparatus 112. The management computer 101 may include an input/output apparatus (not illustrated). Here, the input/output apparatus refers to, for example, a touch panel, a display, a keyboard, a mouse, or the like. The processor 111 implements configuration plan calculation processing 121 and construction execution processing 122 by loading a program to the storage apparatus 112 and executing the program. Further, the storage apparatus 112 stores policy conversion information 131, configuration condition information 132, calculation information 133 and fee information 134 in addition to data corresponding to the configuration plan calculation processing 121 and the construction execution processing 122. Processing and information stored in the storage apparatus 112 may be stored in storage apparatuses different from each other or may be stored in a storage apparatus (not illustrated) coupled via the network 103.

The configuration plan calculation processing 121 is processing of calculating a system configuration plan in accordance with policies selected via the input/output apparatus 141 and displaying a calculation result via the input/output apparatus 141.

The construction execution processing 122 is processing of constructing a target system in accordance with the configuration plan output in the configuration plan calculation processing 121 on the cloud service 104. In this event, processing of causing program data held in the repository server 105 to be copied to the cloud service 104 may be performed.

The policy conversion information 131 is information in which policies to be displayed on the input/output apparatus 141 are associated with values to be utilized in the configuration plan calculation processing 121.

The configuration condition information 132 is information that holds information on rough estimation of performance and availability that can be implemented by a combination of a number of functions to be provided by the cloud service 104 and rough estimation of cost.

The calculation information 133 is information that holds a rule for calculation of sizing functions to be utilized in the configuration indicated by the configuration condition information 132.

The fee information 134 is basic information for calculating a fee in a case where the configuration indicated by the configuration condition information 132 is utilized in sizing calculated in the calculation information 133.

The operation terminal 102, which is, for example, laptop machine, a tablet terminal, or the like, includes an input/output apparatus 141. The input/output apparatus 141 is, for example, a touch panel, a display, a keyboard, a mouse, or the like.

The network 103 is a communication path coupled in a wired or wireless manner. While the network 103 is, for example, a wired LAN cable or a wireless WiFi, the network 103 is not limited to these.

The cloud service 104, which includes a network apparatus, a server, a storage, and the like, provides various kinds of IT services that meet designated requirements, such as, for example, a virtual server and a Database service in response to a request from the construction execution processing 122. For example, the cloud service may be provided by a company that provides a cloud service as business or may be a computer system uniquely held by an individual or a company.

The repository server 105 is a server that has program information to be stored on the cloud service 104 in response to a request from the construction execution processing 122. The repository server 105 is, for example, Github, or the like.

Figure 2:
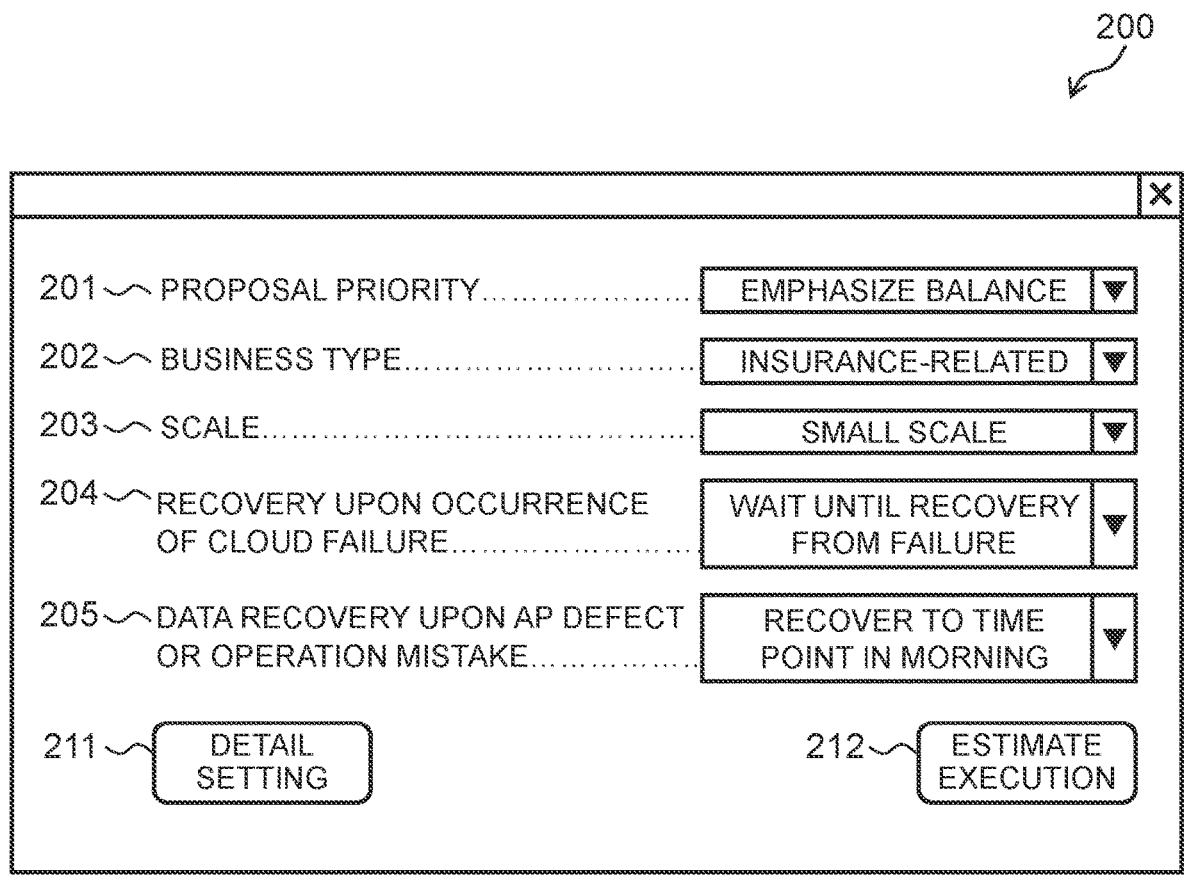
FIG. 2 is an example of a policy input screen.

FIG. 2 is an example of a policy input screen in which policies to be input to the configuration plan calculation processing 121 are to be input in the first embodiment of the present invention. The policy input screen 200 includes policies, a detail setting button 211 for calling a detail setting screen (not illustrated) and an estimate execution button 212 for giving an instruction to start calculation of a configuration plan. Here, the detail setting screen (not illustrated) is an input screen for setting an arbitrary value without utilizing information on the policy conversion information 131 held by the management computer 101. In a case where the detail setting screen (not illustrated) is displayed in advance in the policy input screen 200 or in a case where an arbitrary setting value is not allowed to be used, the policy input screen 200 does not have to include the detail setting button 211. The policies to be set on the policy input screen 200 include a proposal priority policy 201, a business type policy 202, a scale policy 203, a recovery policy 204 upon occurrence of a cloud failure, and a data recovery policy 205 upon AP defect or operation mistake and may further include some policies (not illustrated). Further, in a case where some of these policies are not allowed to be arbitrarily set, the policies do not have to be displayed on the screen.

The policies to be selected on the policy input screen 200 have a selectable form such as, for example, a pull-down menu. The policies that can be selected on the policy input screen 200 only require to be displayed in accordance with values defined in the policy conversion information 131 held by the management computer 101. Random or fixed values may be selected in advance by the management computer 101 for all or some of the policies that can be selected on the policy input screen 200.

Figure 3:
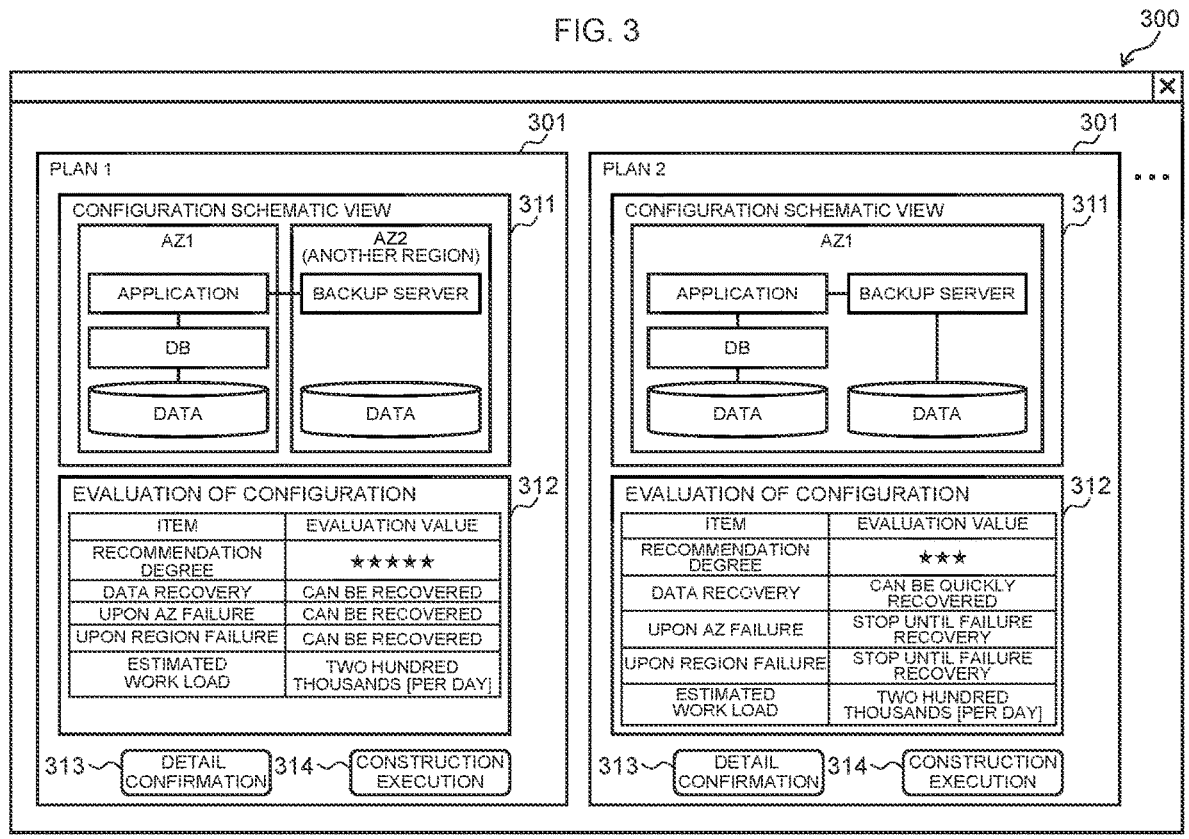
FIG. 3 is an example of a configuration plan presentation screen.

FIG. 3 is an example of a configuration plan presentation screen that displays a configuration plan output by the configuration plan calculation processing 121 in the first embodiment of the present invention. The configuration plan presentation screen 300 includes a plurality of configuration plans 301. While only two configuration plans are displayed on the configuration plan presentation screen 300 illustrated in FIG. 3, the configuration plan presentation screen 300 only requires to make it possible to perform comparison among a plurality of configuration plans, and only one arbitrary selected configuration plan may be displayed, or three or more configuration plans may be displayed.

The configuration plan 301 includes a configuration schematic view 311, evaluation of the configuration 312, a detail confirmation button 313, and a construction execution button 314. The detail confirmation button 313 is a button for calling a detail confirmation screen (not illustrated) that allows confirmation of details of advantages and disadvantages of the configuration calculated in the configuration plan calculation processing 121. In a case where detailed information (not illustrated) is displayed in advance in the configuration plan 301, the detail confirmation button 313 does not have to be provided. The construction execution button 314 is a button for calling the construction execution processing 122 and constructing a target system in accordance with the corresponding configuration plan 301. In a case where the management computer 101 only requires to execute the configuration plan calculation processing 121 and does not intend to execute the construction execution processing 122, the construction execution button 314 does not have to be provided.

The configuration schematic view 311 is a screen area in which a view illustrating outline of a system configuration of the target system indicated by the configuration plan 301 is displayed. For example, it is only necessary to perform display using a method such as a method in which images of configuration diagrams corresponding to combinations of cloud service functions held by the configuration condition information 132 held by the management computer 101 are held in advance, and an image corresponding to a combination of cloud service functions corresponding to the configuration plan is displayed.

The evaluation of the configuration 312 is a screen area in which outline of advantages and disadvantages of the configuration calculated in the configuration plan calculation processing 121 is displayed. As the information to be displayed in the evaluation of the configuration 312, all or some of values calculated in configuration plan calculation processing flow 400 may be directly displayed or may be abstracted and displayed as illustrated in FIG. 3. In a case where the values are abstracted and displayed as illustrated in FIG. 3, for example, it is only necessary to calculate the information through processing in which the management computer 101 holds in advance a display language correspondence table corresponding to values of a logical failure tolerance field 1002, an AZ failure tolerance 1003 and a Region failure tolerance field 1004 held in the configuration condition information 1000 and displays the information.

Figure 4:
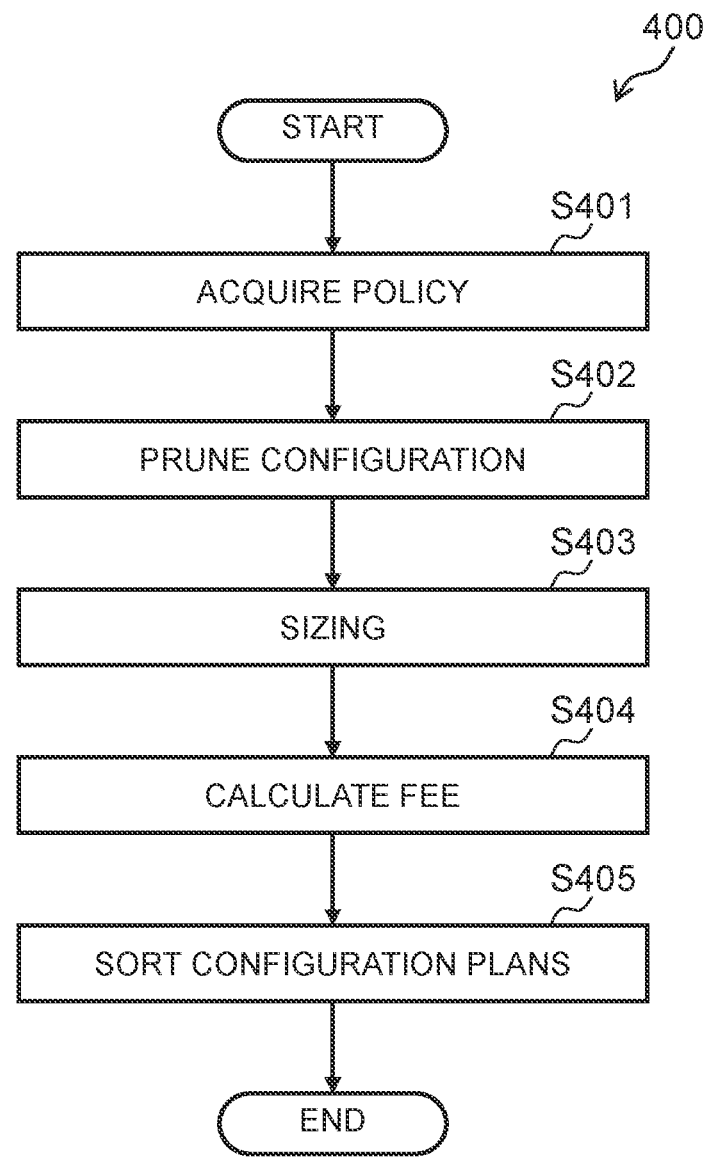
FIG. 4 is a flowchart illustrating a procedure example of configuration plan calculation processing of a management computer.

FIG. 4 is a flowchart illustrating a procedure example of the configuration plan calculation processing 121 of the management computer 101. The configuration plan calculation processing 121 illustrated in the present flowchart is executed by an instruction from the estimate execution button 212 on the policy input screen 200 displayed at the input/output apparatus 141. Alternatively, the configuration plan calculation processing 121 may be executed by an instruction of some kind of program.

In FIG. 4, the management computer 101 executes policy acquisition processing (S401), configuration pruning processing (S402), sizing processing (S403), fee calculation processing (S404) and configuration plan sort processing (S405). The configuration plan calculation processing flow 400 may include other processing steps (not illustrated) or order of some processing may be exchanged, or some processing may be executed in parallel within a range not causing inconsistency in input and output.

In the policy acquisition processing (S401) of the configuration plan calculation processing flow 400, the management computer 101 acquires information corresponding to the policies selected on the policy input screen 200 from the policy conversion information 131. Details of the information held by the policy conversion information 131 are illustrated in FIG. 5, FIG. 6, FIG. 7, FIG. 8 and FIG. 9.

FIG. 5 is an explanatory diagram illustrating an example of information corresponding to the proposal priority policy 201 input on the policy input screen 200 among the policy conversion information 131. The proposal priority table 500 includes a proposal priority field 501, a sort key field 502 and an order field 503. Information corresponding to the proposal priority field 501 is displayed as options of the proposal priority policy 201 on the policy input screen 200. In the policy acquisition processing (S401), values of the sort key field (502) and the order field (503) in a row corresponding to the option selected in the proposal priority policy 201 are acquired. The values acquired here are utilized in the configuration plan sort processing (S405). Information on the proposal priority table 500 is information prepared in advance manually or by some kind of application program.

FIG. 6 is an explanatory diagram illustrating an example of information corresponding to the business type policy 202 input on the policy input screen 200 among the policy conversion information 131. A business type table 600 includes a business type field 601, an IO coefficient field 602, a data amount coefficient 603, an RTO coefficient 604 and an RPO coefficient 605. Information corresponding to the business type field 601 is displayed as options of the business type policy 202 on the policy input screen 200. In the policy acquisition processing (S401), values of the IO coefficient field 602, the data amount coefficient field 603, the RTO coefficient field 604 and the RPO coefficient field 605 in a row corresponding to the option selected in the business type policy 202 are acquired. The values acquired here are utilized in the sizing processing (S403). Information of the business type table 600 is information prepared in advance manually or by some kind of application program.

Figure 7:
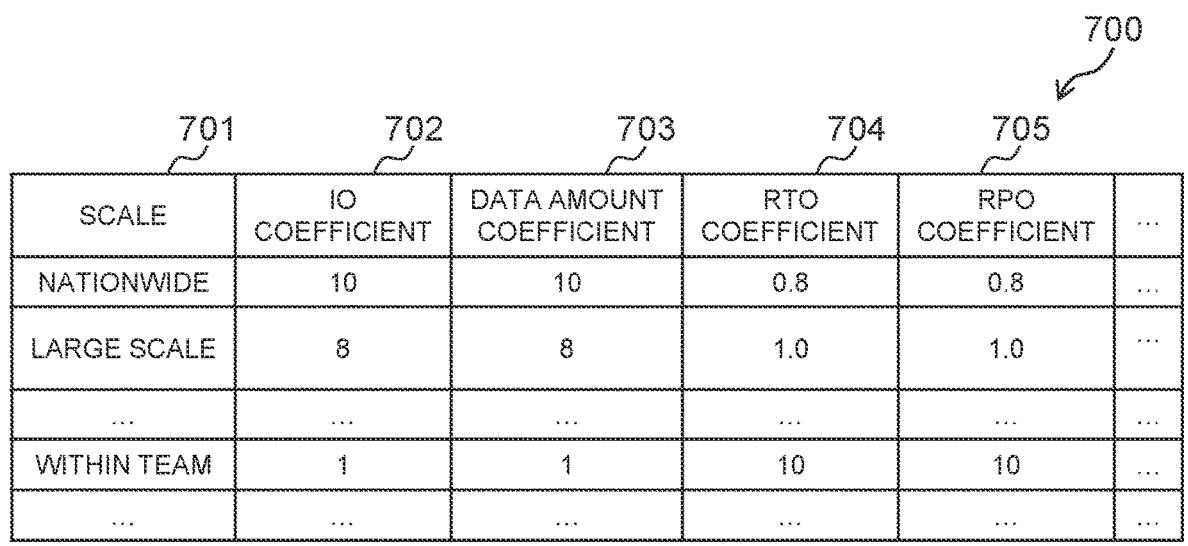
FIG. 7 is an example of information corresponding to a scale policy.

FIG. 7 is an explanatory diagram illustrating an example of information corresponding to the scale policy 203 input on the policy input screen 200 among the policy conversion information 131. A scale table 700 includes the business type field 701, the IO coefficient field 702, a data amount coefficient 703, an RTO coefficient 704, an RPO coefficient 705. Information corresponding to the scale field 701 is displayed as options of the scale policy 203 on the policy input screen 200. In the policy acquisition processing (S401), values of the IO coefficient field 702, the data amount coefficient 703, the RTO coefficient 704, and the RPO coefficient 705 in a row corresponding to the option selected in the scale policy 203 are acquired. The values acquired here are utilized in the sizing processing (S403). Information of the scale table 700 is information prepared in advance manually or by some kind of application program.

FIG. 8 is an explanatory diagram illustrating an example of information corresponding to the recovery policy 204 upon occurrence of a cloud failure input on the policy input screen 200 among the policy conversion information 131. A recovery policy table 800 upon occurrence of a cloud failure includes a recovery policy field 801 and a determination value field 802. Information corresponding to the recovery policy field 801 is displayed as options of the recovery policy 204 upon occurrence of a failure on the policy input screen 200. In the policy acquisition processing (S401), a value of the determination value field 802 in a row corresponding to the option selected in the recovery policy 204 upon occurrence of a failure is acquired. The value acquired here is utilized in the configuration pruning processing (S402). Information of the recovery policy table 800 upon occurrence of a cloud failure is information prepared in advance manually or by some kind of application program.

Figure 9:
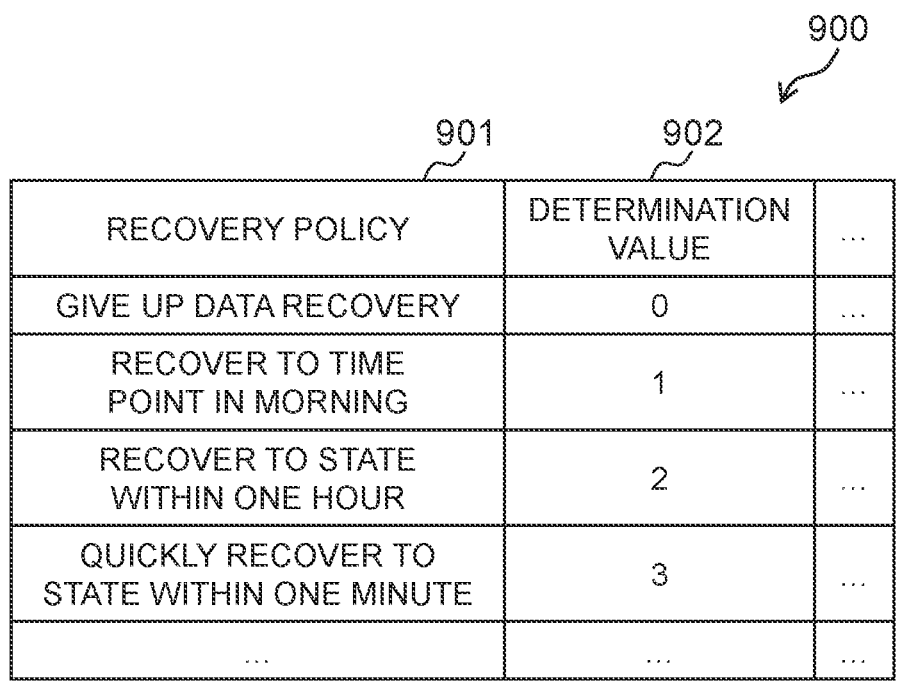
FIG. 9 is an example of information corresponding to a data recovery policy upon AP defect or operation mistake.

FIG. 9 is an explanatory diagram illustrating an example of information corresponding to a data recovery policy 205 upon AP defect or operation mistake input on the policy input screen 200 among the policy conversion information 131. The data recovery policy table 900 upon AP defect or operation mistake includes a recovery policy field 901 and a determination value field 902. Information corresponding to the recovery policy field 901 is displayed as options of the data recovery policy 205 upon AP defect or operation mistake on the policy input screen 200. In the policy acquisition processing (S401), a value of the determination value field 902 in a row corresponding to the option selected in the data recovery policy 205 upon AP defect or operation mistake is acquired. The value acquired here is utilized in the configuration pruning processing (S402). Information of the data recovery policy table 900 upon AP defect or operation mistake is information prepared in advance manually or by some kind of application program.

The configuration pruning processing (S402) of the configuration plan calculation processing flow 400 is processing in which the management computer 101 prunes the configuration plan of the target system using the values acquired in the policy acquisition processing (S401) and the configuration condition information 132. The information held in the configuration condition information 132 is illustrated in FIG. 10.

FIG. 10 is an explanatory diagram illustrating an example of the configuration condition information 132. A configuration condition information table 1000 includes a configuration field 1001, a logical failure tolerance field 1002, an AZ failure tolerance field 1003, a Region failure tolerance field 1004, an increased data cost field 1005 and an increased server cost field 1006. The configuration field 1001 is information indicating a combination of functions of the cloud service. In the logical failure tolerance field 1002, an evaluation value of recovery performance when a logical failure occurs in the configuration is described. In the AZ failure tolerance field 1003, an evaluation value of recovery performance when an AZ failure occurs in the configuration is described. In the Region failure tolerance field 1004, an evaluation value of recovery performance when a region failure occurs in the configuration is described. In the increased data cost field 1005, an evaluation value of influence of a multiplication factor of cost by increase of data in the configuration is described. In the increased server cost field 1006, an evaluation value of influence of a multiplication factor of cost by increase of servers in the configuration is described.

For example, a configuration in a first row in FIG. 10 indicates a configuration in which in a case where a certain system is operated on a service of company A, one backup server is provided in the same region and in the same availability zone. The region, which is a point at which physical machine such as a server that provides the cloud service operates, is, for example, a data center, or the like, and is described as R or Region in the drawing and will be described as R or Region also in the specification. The availability zone, which is an independent resource group within the region, is, for example, a range of resources divided by, for example, rooms, racks, or the like, is described as AZ in the drawing and will be described as AZ also in the specification.

As indicated in the first row in FIG. 10, in a case where a backup system is provided in the same Region in the same AZ, for example, in a case where data disappears due to an accident of, for example, a user of an application unintentionally deleting data, the data can be quickly recovered using backup data. Thus, a high evaluation value of 3 is stored as the evaluation value of the logical failure tolerance field 1002.

In the configuration indicated in the first row in FIG. 10, for example, in a case where a failure called a region failure that makes it impossible to access the cloud service in a region unit occurs or a failure that causes a defect occurs in a region in which the target system is operating, or in a case where a failure called an AZ failure that makes it impossible to access the cloud service in an AZ unit or a failure that causes a defect occurs in an AZ in which the target system is operating, it is difficult to perform recovery from inaccessibility or a defect that has occurred in the target system, and thus, low evaluation values of 0 are stored as the evaluation values of the AZ failure tolerance field 1003 and the Region failure tolerance field 1004.

In the configuration indicated in the first row in FIG. 10, a backup system is configured separately from the target system, and it is necessary to activate virtual machine for executing backup processing and restore processing and store data for backup separately from the target system, and thus, in a case where the system is configured, more cloud services than those in a case where the target system is independently operated are utilized. In the configuration, a double data amount is stored, and thus, an evaluation value of 2 is stored in the increased data cost field 1005. In the configuration, virtual machine for executing backup restore processing is required, and thus, an evaluation value of 1 is stored in the increased server cost field 1006.

As indicated in FIG. 10, even in a case where a single function is used, evaluation values for recovery performance with respect to a logical failure, an AZ failure and a Region failure are different depending on a plurality of implementation methods, and combinations of evaluation values for recovery performance and cost are different by using combinations of a plurality of functions. There is a case where effects and cost are different depending on cloud service providers even in a case where similar functions are used. The configuration condition information table 1000 may be manually prepared in advance on the basis of these kinds of knowledge or may be information calculated by some kind of application program.

Although values mainly using the examples of the functions of company A are stored as values in the configuration field 1001 indicated in FIG. 10, functions of other cloud services may be utilized, or unique services utilizing IT resources possessed by a company or an individual may be utilized.

In the configuration pruning processing (S402), the management computer 101 compares the determination value 902 in the data recovery policy table 900 upon AP defect or operation mistake acquired in the policy acquisition processing (S401) with the value in the logical failure tolerance field 1002 and in a case where the value in the logical failure tolerance field 1002 is smaller than the value of the determination value 902, excludes the configuration from a proposal target. Further, in the configuration pruning processing (S402), the management computer 101 compares the determination value 802 in the recovery policy table 800 upon occurrence of a cloud failure acquired in the policy acquisition processing (S401) with the both values of the AZ failure tolerance field 1003 and the Region failure tolerance field 1004 and in a case where the both values of the AZ failure tolerance field 1003 and the Region failure tolerance field 1004 are smaller than the determination value 802, excludes the configuration from the proposal target.

In the configuration pruning processing (S402), normally, if one of the value of the AZ failure tolerance field 1003 and the value of the Region failure tolerance field 1004 is equal to or larger than the determination value 802, the configuration is determined as the proposal target and is not excluded from configurations that are candidates for proposal. However, for example, exception processing may be performed such as processing of performing determination only with the value of the AZ failure tolerance field regardless of the value of the Region failure tolerance field in a case where tolerance for an AZ failure is essential by the detail setting screen (not illustrated) and processing of performing determination only with the value of the Region failure tolerance field regardless of the value of the AZ failure tolerance field in a case where tolerance for the Region failure is essential by the detail setting screen (not illustrated).

In the sizing processing (S403) of the configuration plan calculation processing flow 400, the management computer 101 calculates construction target system load and a data amount to be held by the system by utilizing the values acquired in the policy acquisition processing (S401) and performs processing of sizing components in the configuration that becomes a proposal candidate remaining without being excluded in the configuration pruning processing (S402) on the basis of the calculated values.

First, system load calculation processing will be described.

FIG. 11 is a flowchart illustrating system load calculation processing to be executed by the management computer 101. System load calculation processing 1100 indicated in the present flowchart only requires to be executed by an instruction from a sizing processing step (S403) in the configuration plan calculation processing flow 400.

In FIG. 11, the management computer 101 executes operation IC amount estimation processing (S1101), DB transaction amount calculation processing (S1102) and storage IO amount calculation processing (S1103). The system load calculation processing flow 1100 may include other processing steps (not illustrated).

Further, in a case where an operation IO amount per day is input by the detail setting screen (not illustrated) in the policy input screen 200, part of processing of the operation IO amount estimation processing (S1101) does not have to be executed, or in a case where both of the operation IO amount and operation IO density per day are designated, the operation IO amount estimation processing (S1101) does not have to be executed. Further, in a case where a value of DB transaction density is designated by the detail setting screen (not illustrated) in the policy input screen 200, the DB transaction amount calculation processing (S1102) does not have to be executed. Still further, in a case where storage IO density is designated by the detail setting screen (not illustrated) in the policy input screen 200, the storage IO amount calculation processing (S1103) does not have to be executed.

In the operation IO amount estimation processing (S1101), the management computer 101 calculates the operation IO amount per day and operation IO density when peak load is applied as requirements to be exerted by the construction target system. The operation IO amount per day and the calculated operation IO density are utilized in the sizing of a virtual server, a storage and a network in the sizing processing (S403). First, the management computer 101 calculates the operation IO amount per day to be processed by the target system by multiplying the value of the IO coefficient 602 in the business type table 600 acquired in the policy acquisition processing (S401), the IO coefficient 702 in the scale table 700, and an operation IO eigen value, as in the flowing expression.

Operation IO amount per day=IO coefficient 602×IO coefficient 702×operation IO eigen value Then, a peak value of operation load per second is calculated as the operation IO density by multiplying a load coefficient at peak time after dividing the operation IO amount per day by business hours of one day×60×60, as in the following expression.

Operation IO density=operation IO amount per day/ (business hours of one day×60×60)×load coefficient at peak time As the values of the operation IO eigen value, the business hours of one day and the load coefficient at peak time, fixed values held by the management computer 101 may be utilized or values input from the detail setting screen (not illustrated) in the policy input screen 200 may be utilized.

In the DB transaction amount calculation processing (S1102), the management computer 101 calculates DB transaction density. A value of the calculated DB coefficient transaction density is utilized in sizing of a DB service in the sizing processing (S403). In the DB transaction amount calculation processing (S1102), the management computer 101 calculates the DB transaction density by multiplying the value of the operation IC density calculated in the operation IC amount estimation processing (S1101) and a DB access coefficient per operation IC, as in the following expression.

DB transaction density=operation IC density×DB access coefficient per operation IC As the value of the DB access coefficient per operation IC, a fixed value held by the management computer 101 may be utilized, or a value input from the detail setting screen (not illustrated) in the policy input screen 200 may be utilized.

In the storage IC amount calculation processing (S1103), the management computer 101 calculates storage IC density. A value of the calculated storage IC density is utilized in sizing of a storage service in the sizing processing (S403). In the storage IC amount calculation processing (S1103), the management computer 101 calculates the storage IC density by multiplying the value of the DB transaction density calculated in the DB transaction amount calculation processing (S1102) and a storage IC coefficient per DB access, as in the following expression.

Storage IC density=DB transaction density×storage IC coefficient per DB access

As the value of the storage IC coefficient per DB access, a fixed value held by the management computer 101 may be utilized, or a value input from the detail setting screen (not illustrated) in the policy input screen 200 may be utilized.

Calculation expressions indicated in the description in the respective processing steps in the description of the system load calculation processing 1100 only require to be stored as the calculation information 133 of the management computer 101.

Calculation processing of data capacity held by the target system, to be executed by the management computer 101 in the sizing processing (S403) will be described. In calculation of the data capacity, the management computer 101 calculates the data capacity of the target system by multiplying a value of the data amount coefficient 603 in the business type table 600 acquired in the policy acquisition processing (S401), the data amount coefficient 703 in the scale table 700 and a data amount eigen value, as in the following expression.

$$\text{Data capacity} = \text{data amount coefficient } 603 \times \text{data amount coefficient } 703 \times \text{data amount eigen value}$$

As the data amount eigen value, a fixed value held by the management computer 101 may be utilized, or a value input from the detail setting screen (not illustrated) in the policy input screen 200 may be utilized.

In the sizing processing (S403), the management computer 101 performs performance design processing of computer resources to be utilized in the target system, such as, for example, performance calculation of virtual machine, a storage function, a network function, a backup function and a cluster function. The performance design processing to be executed here only requires to be executed by utilizing the values calculated in the above-described processing of the sizing processing (S403) and some kind of application program. Alternatively, the management computer 101 may hold a plurality of correspondence tables as illustrated in FIG. 12 as the calculation information 133 and may execute performance design processing of each function.

FIG. 12 is an explanatory diagram illustrating an example of a DB instance sizing table as a correspondence table to be utilized when DB instances are subjected to sizing as one example of data to be utilized in the performance design processing of various kinds of functions as one of the calculation information 133. A DB instance sizing table 1200 includes a DB transaction density field 1201 and a machine specs field 1202. Information of the DB instance sizing table 1200 is information prepared in advance manually or by some kind of application program. The machine specs indicated in FIG. 12 is merely an example, and it is only necessary to hold information for each service to be provided by each company.

In a case where the DB instances are subjected to sizing in the sizing processing (S403), for example, it is only necessary to compare a value of the DB transaction density calculated in the sizing processing (S403) described above and the DB transaction density field 1201 and output a value of the machine specs field 1202 in a row in which the value of the DB transaction density falls as a size of the DB instance to be constructed.

In the sizing processing (S403), the management computer 101 may calculate target values of RPO and RTO to be input to a tool that estimates backup performance to estimate backup performance. Here, the RPO is an abbreviation of recovery point objective and refers to a recovery point target value indicating a state of which timing dating back from occurrence of a failure the system is to be recovered upon occurrence of the failure, and the RTO is an abbreviation of recovery time objective and refers to a target value of a target recovery period indicating how long it should take to recover the system upon occurrence of a failure. In calculation of the RPO and the RTO, for example, it is only necessary to calculate a target value of the RTO by multiplying the value of the RTO coefficient field 604 in the business type table 600 acquired in the policy acquisition processing (S401), a value of the RTO coefficient field in the scale table 700 and an RTO coefficient internally held by the management computer 101. In a similar manner, it is only necessary to calculate a target value of the RPO by multiplying the value of the RPO coefficient field 605 in the business type table 600 acquired in the policy acquisition processing (S401), the value of the RPO coefficient field in the scale table 700 and an RPO coefficient internally held by the management computer 101.

Further, as the RTO coefficient and the RPO coefficient internally held by the management computer 101, values set from the detail setting screen (not illustrated) in the policy input screen 200 may be used. Further, target values of the RPO and the RTO may be directly input from the detail setting screen (not illustrated) in the policy input screen 200.

In the fee calculation processing (S404) in the configuration plan calculation processing flow 400, the management computer 101 executes fee calculation in each configuration. It is only necessary to respectively execute calculation of fees of functions to be utilized in respective configurations using an application program that executes some kind of estimate. Alternatively, a fee table for each function to be utilized in the configuration condition information 132 may be held as fee information 134, and a fee may be calculated using a numerical value calculated in the processing described above in the configuration plan calculation processing flow 400.

The configuration plan sort processing (S405) in the configuration plan calculation processing flow 400 is processing of calculating display priority order of the calculated candidates for the configuration plan. Values of cost and performance for each configuration plan calculated in the sizing processing (S403) in the configuration plan calculation processing flow 400, values of the logical failure tolerance field 1002, the AZ failure tolerance field 1003 and the Region failure tolerance field 1004 in the configuration condition information table 1000 as the evaluation values of availability in each configuration, the value of the sort key field 502 in the proposal priority table acquired in the policy acquisition processing (S401) and the value of the order field 503 are utilized. In the fee calculation processing (S404), the management computer 101 performs sorting to achieve order indicated by the information in the order field 503 using the information indicated in the sort key field 502. For example, in a case where the value of the proposal priority field 501 in the first row indicated in FIG. 5 is "emphasize balance", the value of the sort key field is availability/cost. In this case, the management computer 101 calculates numerical values by dividing a value obtained by adding three values of the logical failure tolerance field 1002, the AZ failure tolerance field 1003 and the Region failure tolerance field 1004 in the configuration condition information table 1000 in each configuration by the value of the cost calculated in the fee calculation processing (S404) as sorting evaluation values and sorts the results in descending order as indicated by the values in the order field 503. Note that while star rates are displayed as recommendation degrees in a configuration evaluation area 312 in the configuration plan presentation screen 300 indicated in FIG. 3, it is only necessary to calculate the number of star rates, for example, using a rule such that the highest evaluation value has five stars, configurations of top ten percent other than the above have four stars, configurations of top thirty percent other than the above have three stars among the sorting evaluation values calculated in the configuration plan sort processing (S405).

The management computer 101 executes the construction execution processing 122 of constructing the configuration corresponding to an arbitrary configuration plan 301 on the cloud service 104 in accordance with an instruction from the construction execution button 314 on the configuration plan presentation screen 300 displayed via the input/output apparatus 141 of the operation terminal 102. The construction execution processing 122 only requires to be executed by some kind of application program of issuing a construction instruction by means of command operation by an API, automatic execution operation of a GUI, and the like, in which case, construction processing may be implemented by utilizing program data stored in the repository server 105.

As described above, according to the embodiment in the present invention, the management computer 101 can calculate sizing requirements on the basis of policies regarding a business type, a scale and availability of the target system, select a system configuration by a combination of cloud service functions that satisfy the policies, and derive candidates for an optimal system configuration in recommended order on the basis of the calculated sizing requirements and cost information. By this means, it is possible to determine an appropriate system configuration among a number of cloud services while taking into account requirements such as performance and availability and cost, so that it is possible to automatically construct a target system as necessary.

As described above, the disclosed computer system includes the processor 111, the storage apparatus 112 and the input/output apparatus 141, and the storage apparatus 112 stores at least the configuration condition information 132 indicating evaluation values for system configurations that can be constructed on cloud, the input/output apparatus 141 accepts a configuration request indicating a condition for a system configuration to be constructed on the cloud, the processor 111 obtains an evaluation value corresponding to the configuration request, compares the evaluation value corresponding to the configuration request with the evaluation values of the configuration condition information and determines a candidate for a system configuration to be proposed on the basis of a result of the comparison, and the input/output apparatus 141 outputs the candidate for the system configuration to be proposed.

Thus, the disclosed computer system can support appropriate selection of a configuration of a cloud system.

Further, the processor 111 obtains evaluation values of a plurality of items from the configuration request, narrows down system configurations that can be a candidate from the system configurations that can be constructed using part of the evaluation values of the plurality of items and ranks the narrowed down system configurations on the basis of the evaluation values of the plurality of items to determine a system configuration to be proposed.

In this event, the processor 111 performs ranking on the basis that a size of the system configuration to be proposed is small and/or cost of the system configuration to be proposed is low.

By performing configuration pruning and sizing stepwise in this manner, it is possible to efficiently determine an appropriate system configuration.

Further, the configuration request indicates policies regarding a business type, a scale and availability of a system, and the processor 111 converts the policies of the business type, the scale and the availability into evaluation values of a plurality of items and compares the evaluation values of the plurality of items with the evaluation values of the configuration condition information.

Then, the processor 111 narrows down system configurations that can be a candidate from the system configurations that can be constructed on the basis of the evaluation value obtained from the availability and ranks the narrowed down system configurations on the basis of the evaluation values obtained from the business type and the scale to determine the system configuration to be proposed.

By performing configuration pruning using availability and performing sizing using a business type and a scale in this manner, it is possible to propose a system configuration with reduced cost while reliably satisfying requirements for recovery.

Further, the input/output apparatus 141 outputs the candidate for the system configuration to be proposed and the evaluation value corresponding to the configuration request and accepts input of correction of the configuration request, and the processor 111 determines the candidate for the system configuration to be proposed again in accordance with the correction.

Then, the input/output apparatus 141 accepts a construction execution request for the output candidate for the system configuration, and the processor 111 executes system construction processing for a system configuration designated in the construction execution request.

It is therefore possible to arbitrarily search for an appropriate system configuration and easily construct the determined system configuration.

Note that the present invention is not limited to the above-described example and incorporates various modifications. For example, the above-described example is described in detail to describe the present invention in an easy-to-understand manner, and the present invention is not necessarily limited to one including all the described components. Further, replacement and addition of components as well as deletion of components are possible.

For example, while a case has been described in the above-described example where configuration pruning is performed on the basis of the policy of the availability and sizing is performed on the basis of the policies of the business type and the scale, it is also possible to use other policies such as a policy regarding a response time. Further, one policy may be utilized in both configuration pruning and sizing. For example, configuration pruning may be performed using a minimum response time, and then, a score of the response time may be used in sizing.

REFERENCE SIGNS LIST

101 management computer
102 operation terminal
103 network
104 cloud service
105 repository server
111 processor
112 storage apparatus
121 configuration plan calculation processing
122 construction execution processing
131 policy conversion information
132 configuration condition information
133 calculation information
134 fee information

What is claimed is:
1. A computer system comprising:
a processor;
a storage apparatus; and
an input/output apparatus,
wherein the storage apparatus stores at least configuration condition information including a plurality of system configurations configured to be constructed in a cloud and evaluation values for each system configuration, the evaluation values including a logical failure tolerance value, a cloud configuration failure tolerance value, and a region failure tolerance value, wherein the input/output apparatus accepts a configuration request indicating a condition for a system configuration to be constructed on the cloud,
wherein the processor is configured to:
obtain a first value relating to a first recovery policy corresponding to the configuration request,
obtain a second value relating to a second recovery policy corresponding to the configuration request,
determine, as a first determination, whether the cloud configuration failure tolerance value is smaller than the first value and whether the region failure tolerance value is smaller than the first value,
determine, as a second determination, whether the logical failure tolerance value is smaller than the second value,
determine a candidate for a system configuration to be proposed on a basis of a result of the first determination and the second determination, and
wherein the input/output apparatus outputs the candidate for the system configuration to be proposed.

2. The computer system according to claim 1,
wherein the processor is configured to
obtain values of a plurality of items from the configuration request, including the first value and the second value,
narrow down configuration systems that are eligible to be candidates can from the system configurations that can be constructed using the obtained values of the plurality of items, and
rank the narrowed down system configurations on a basis of the values of the plurality of items to determine the system configuration to be proposed.

3. The computer system according to claim 2,
wherein the processor performs the ranking on a basis that a size of the system configuration to be proposed and a cost of the system configuration to be proposed.

4. The computer system according to claim 1,
wherein the configuration request indicates policies regarding a business type, a scale and availability of a system, and
wherein the processor converts the policies of the business type, the scale and the availability into values of a plurality of items, and
performs determinations, including the first determination and the second determination, of the values of the plurality of items with the evaluation values of the configuration condition information.

5. The computer system according to claim 4,
wherein the processor is configured narrow down system configurations to be candidates from the system configurations that are configured to be constructed on a basis of an evaluation value obtained from the availability and ranks the narrowed down system configurations on a basis of evaluation values obtained from the business type and the scale to determine the system configuration to be proposed.

6. The computer system according to claim 1,
wherein the input/output apparatus is configured to:
output the candidate for the system configuration to be proposed and the evaluation value corresponding to the configuration request, and
accept an input of a correction of the configuration request, and
wherein the processor is configured to determine the candidate for the system configuration to be proposed again in accordance with the correction.

7. The computer system according to claim 1,
wherein the input/output apparatus is configured to accept a construction execution request for the output candidate for the system configuration, and
wherein the processor is configured to execute system construction processing for a system configuration designated in the construction execution request.

8. A system configuration candidate output method to be performed by a computer system, the system configuration candidate output method comprising:
storing at least configuration condition information including a plurality of system configurations configured to be constructed in a cloud and evaluation values for each system configuration, the evaluation values including a logical failure tolerance value, a cloud configuration failure tolerance value, and a region failure tolerance value;
accepting a configuration request indicating a condition for a system configuration to be constructed on the cloud;
obtaining a first value relating to a first recovery policy corresponding to the configuration request;
obtaining a second value relating to a second recovery policy corresponding to the configuration request;
determining, as a first determination, whether the cloud configuration failure tolerance value is smaller than the first value and whether the region failure tolerance value is smaller than the first value;
determining, as a second determination, whether the logical failure tolerance value is smaller than the second value;
determining a candidate for a system configuration to be proposed on a basis of a result of the first determination and the second determination; and
outputting the candidate for the system configuration to be proposed.

9. A non-transitory storage medium storing a system configuration candidate output program, the system configuration candidate output program causing a computer system that stores at least configuration condition information including a plurality of system configurations configured to be constructed on cloud and evaluation values for each system configuration, the evaluation values including a logical failure tolerance value, a cloud configuration failure tolerance value, and a region failure tolerance value, to execute steps comprising:
accepting a configuration request indicating a condition for a system configuration to be constructed on the cloud;
obtaining a first value relating to a first recovery policy corresponding to the configuration request;
obtaining a second value relating to a second recovery policy corresponding to the configuration request;
determining, as a first determination, whether the cloud configuration failure tolerance value is smaller than the first value and whether the region failure tolerance value is smaller than the first value;
determining, as a second determination, whether the logical failure tolerance value is smaller than the second value;
determining a candidate for a system configuration to be proposed on a basis of a result of the first determination and the second determination; and
outputting the candidate for the system configuration to be proposed.

* * * * *